(12) United States Patent
Sandahl et al.

(10) Patent No.: US 9,798,935 B2
(45) Date of Patent: Oct. 24, 2017

(54) METHOD FOR DETERMINING A BODY PARAMETER OF A PERSON

(71) Applicant: VOLVO CAR CORPORATION, Goeteborg (SE)

(72) Inventors: Andreas Sandahl, Goeteborg (SE); David De Val, Goeteborg (SE); Birgit Klinton Kaamark, Askim (SE); Magnus Baeckelie, Hisings-Backa (SE); Marcus Rothoff, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 98 days.

(21) Appl. No.: 13/913,730

(22) Filed: Jun. 10, 2013

(65) Prior Publication Data

US 2013/0329960 A1    Dec. 12, 2013

(30) Foreign Application Priority Data

Jun. 11, 2012  (EP) ..................................... 12171454

(51) Int. Cl.
  *G06T 7/60*     (2017.01)
  *G06K 9/00*     (2006.01)

(52) U.S. Cl.
  CPC ............ *G06K 9/00791* (2013.01); *G06T 7/60* (2013.01); *G06K 9/00248* (2013.01);
  (Continued)

(58) Field of Classification Search
  CPC ........ B60R 21/01536; B60R 21/01552; B60R 21/01538; B60R 21/01542; B60R 16/037;
  (Continued)

(56) References Cited

U.S. PATENT DOCUMENTS 5,930,379 A  *  7/1999  Rehg .................. G06K 9/00342
                                                    345/473
6,570,608 B1 *  5/2003  Tserng .................... H04N 7/188
                                                    348/143
(Continued)

FOREIGN PATENT DOCUMENTS

CN          101966846       2/2011
CN          102208107       10/2011
(Continued)

OTHER PUBLICATIONS

Extended European Search Report for EP 12171454.7, Completed by the European Patent Office dated Oct. 16, 2012, 7 Pages.
(Continued)

*Primary Examiner* — Kenny Cese
(74) *Attorney, Agent, or Firm* — Brooks Kushman P.C.

(57) ABSTRACT

A method is described for determining a body parameter of a person outside a vehicle. The method may include capturing a first set of data of the person by a first data capturing device of the vehicle, the captured first set of data representative of a first body posture of the person, capturing a second set of data of the person by a second data capturing device of the vehicle, the captured second set of data representative of a second body posture of the person different from the first body posture, and using the first and second sets of data as input for estimation of the body parameter of the person. Use of a data capturing device of a vehicle is also described, and optionally a distance measurement system of the vehicle, for determining a body parameter of a person according to the method.

15 Claims, 6 Drawing Sheets

(52) U.S. Cl.
CPC ..... *G06K 9/00362* (2013.01); *G06K 9/00369* (2013.01); *G06T 2207/30196* (2013.01); *G06T 2207/30252* (2013.01)

(58) Field of Classification Search
CPC .......... B60R 21/0134; B60R 2300/105; B60Q 1/143; G01S 17/026; G06K 9/00369; G06K 9/00362; G06K 9/00201; G06K 9/00348; G06K 2009/3291; G06K 9/00355; G06K 9/0061; G06K 9/00791; G06K 9/3241; G06K 9/00248; G06T 2207/30196; G06T 2207/30252; G06T 2207/30248; G06T 7/60
USPC ........................................................ 382/104
See application file for complete search history.

(56) References Cited

U.S. PATENT DOCUMENTS

| | | | | |
|---|---|---|---|---|
| 9,150,123 | B2* | 10/2015 | Jendritza | B60N 2/002 |
| 2006/0208169 | A1* | 9/2006 | Breed | B60N 2/002 |
| | | | | 250/221 |
| 2007/0047767 | A1* | 3/2007 | Watabe | G06K 9/00805 |
| | | | | 382/103 |
| 2007/0115096 | A1* | 5/2007 | Suzuki | B60R 25/2036 |
| | | | | 340/5.72 |
| 2007/0248245 | A1 | 10/2007 | Aimura et al. | |
| 2007/0291987 | A1* | 12/2007 | Saka | G06K 9/00369 |
| | | | | 382/103 |
| 2008/0278576 | A1* | 11/2008 | Nishigaki et al. | 348/94 |
| 2010/0104199 | A1* | 4/2010 | Zhang | G06K 9/00798 |
| | | | | 382/199 |
| 2011/0243383 | A1* | 10/2011 | Oyaizu | G06T 7/204 |
| | | | | 382/103 |
| 2011/0255748 | A1* | 10/2011 | Komoto | G06T 7/246 |
| | | | | 382/103 |
| 2012/0053794 | A1* | 3/2012 | Alcazar | B60N 2/0244 |
| | | | | 701/48 |
| 2013/0251193 | A1* | 9/2013 | Schamp | G06K 9/00201 |
| | | | | 382/103 |

FOREIGN PATENT DOCUMENTS

| | | | | |
|---|---|---|---|---|
| DE | 102006032769 | | 1/2008 | |
| DE | 102009040995 | | 4/2010 | |
| DE | WO 2012028677 | A1 * | 3/2012 | ............ B60N 2/002 |
| JP | 2009046026 | | 3/2009 | |

OTHER PUBLICATIONS

Broggi et al. Proceedings of the IEEE Inteligent Vehicles Symposium Oct. 3-5, 2000, p. 215-220, "Shape-based Pedestrian Detection."

Scharfenberger et al. IEEE International Conference on Pattern Recognition Aug. 23, 2010, p. 298-301, "Driver Body-Height Prediction for an Ergonomically Optimized Ingress Using a Single Omnidirectional Camera."

Communication from the European Patent Office regarding European Application No. 12171454.7, dated Jul. 20, 2015, 6 Pages.

European Patent Office, Written Opinion for corresponding European Patent Application No. 12 171 454.7, dated Mar. 29, 2016.

Humberto Souto Junior, et al., Automatic Detection of 2D Human Postures Based on Single Images, 24th SIBGRAPI Conference on Graphics, Patterns and Images, Apr. 2011.

Christian Scharfenberger, et al., Robust Body-Height Estimation for Applications in Automotive Industry, Ninth Conference on Computer and Robot Vision, 2012.

European Patent Office, Communication for corresponding European Patent Application No. 12 171 454.7, dated Mar. 29, 2016.

European Patent Office, npl copyright statement for corresponding European Patent Application No. 12 171 154.7, dated Mar. 29, 2016.

Chinese Office Action for Chinese Application No. CN 201310224918.X, English Translation attached to original, dated Aug. 2, 2016, All together 29 Pages.

Chinese Patent Office, Office Action for Chinese Application No. CN 201310224918.X, English translation attached to original, dated Mar. 21, 2017, all together 20 pages.

* cited by examiner

METHOD FOR DETERMINING A BODY PARAMETER OF A PERSON

CROSS-REFERENCE TO RELATED APPLICATIONS

This application claims priority to European Patent Application No. 12171454.7 filed Jun. 11, 2012, the disclosure of which is incorporated in its entirety by reference herein.

TECHNICAL FIELD

The present disclosure relates to a method for determining a body parameter of a person.

BACKGROUND

Document DE 10 2006 032 769 A1 discloses a system including a detecting device for detecting an actual position of a person sitting in a seat of a vehicle. The detecting device comprises an electronic camera directed toward the person and an image evaluation unit. The image evaluation unit assigns body parameters to the outer features of the person. A processing device is provided, which assigns geometrical parameters of the vehicle installations optimized to the body parameters. The document also discloses a method for optimization of geometrical parameters of vehicle installations in the surrounding of the person sitting in the seat of the vehicle.

However, according to DE 10 2006 0320769 A1, anatomical data is only captured for one body posture, i.e. sitting down in the seat. Since the electronic camera most probably is located in the dashboard, some parts of the body, like the feet, will be obscured. Further, the anatomical parameters may be obscured by bulky clothes, such as a winter jacket, or a skirt or a dress.

Document JP2009-046026 A discloses the use of an IR camera, e.g. located in an external mirror of the vehicle. The IR camera is able to see the body of a person through e.g. bulky clothes. However, the use of an extra IR camera makes this solution expensive, and also requires an extra step when manufacturing the vehicle.

There is thus a wish for an improved way of determining a body parameter of a person, who is going to use the vehicle.

SUMMARY

The object of the present disclosure is to overcome or ameliorate at least one of the disadvantages of the prior art, or to provide a useful alternative.

It is desirable to provide a method being able to determine the body parameters of a person, who is going to use the vehicle, even when the body of the person is obscured by clothes.

It is further desirable to provide a method not being dependent on an extra data capturing device, which must be added to the vehicle.

This may be achieved by the subject-matter of claim 1.

Thus, in a first aspect of the present disclosure there is provided a method for determining a body parameter of a person, the person being outside a first vehicle. The method comprises the steps of:

a) capturing a first set of data of the person by means of a first data capturing device of the vehicle, the captured first set of data being representative of a first body posture of the person, b) capturing a second set of data of the person by means of a second data capturing device of the vehicle, the captured second set of data being representative of a second body posture of the person, the second body posture being different from the first body posture, c) using the first and second sets of data as input for estimation of the body parameter of the person.

The person may be a future vehicle occupant, i.e. a driver or a passenger of the vehicle. The body parameter may be used for adjusting an adjustable component of the vehicle, which is exemplified below.

The method according to the disclosure is very useful for vehicles, which are used by many different users, e.g. a rental car or car belonging to a carpool.

Normally, the first and the second data capturing device is the same device, e.g. a camera in the vehicle. The data capturing device may be present in the vehicle, since it is used for another purpose, such as being a part of an anti-collision system of the vehicle. In that case, no additional equipment is needed.

The first and second body postures of the person are different in some way, e.g. due to that the person and/or the data capturing device has/have moved between step a) and b). The whole body of the person or only a part of the body of the person may move. Further, the position relative to the ground may be the same or changed. Purely as an example, the person may maintain his/her position relative to the ground and only move the arms and/or the legs. According to another example, the person may walk in front of the vehicle. The data capturing device may be adapted to follow a continuously moving person. Typically, the vehicle, and thus the data capturing device, maintains its position relative to the ground, i.e. stands still, and the person moves. If the person moves, the relative position between the different parts of the body will be changed, which helps determining the body parameter. However, in principle, the person may be still and the vehicle may move, or both may move.

As an alternative, two different data capturing devices may be used having different locations, thereby seeing the person from two different angles, e.g. a first and a second camera of a stereo camera system. In that case, it is not necessary, but however preferred, that the person and/or the data capturing device moves.

The method may be used for estimating a body parameter or a plurality of body parameters. The body parameter may comprise one or more of: an arm length, a leg length, a body height, an eye position a torso length.

The method may be performed as an iteration process by repeating step b) and optionally step c). As already mentioned above, the same data capturing device, e.g. the same camera, may be used each time when performing step b). Alternatively, two different data capturing devices, such as a first and a second camera of a stereo camera system may be used, e.g. by using each of them every second time in step b), i.e. sequentially, or using them in parallel. Although it is theoretically possible to use more than two data capturing devices, this is normally not the case, since that would increase the number of data capturing devices needed and hence the cost.

The iteration may continue until a stable estimate of the body parameter is achieved. In an embodiment, a stable estimate is reached for a certain body parameter p, when the difference of the estimate number i and the estimate number i−1 is less than a predefined value for that body parameter p, q(p). Further, an additional condition for a stable estimate may be that the basic rules given below are fulfilled.

Preferably the body posture differs between each time of the iteration in one of the ways mentioned above. In case there is no change of the body posture between two consequent iterations, no additional data is provided for the estimation step. However the iteration may continue anyway. If it is seen that the body posture no longer changes for a couple of iterations after each other, this may be a sign that the person stands still. The person may then be requested to move. Alternatively, the estimations achieved may be used as the final estimations.

As an alternative, the method may be performed as iteration by repeating step b) a predefined number of times or during a predefined time interval. Thereafter step c) is performed by using the captured data sets as input for estimation of the body parameter of the person. The predefined number of times or predefined time interval may be selected based on data about how many iterations are normally needed in order to get a stable estimate of the body parameter.

The estimation made in step c) may comprise an assumption of at least one of the following rules:
left-hand side and right-hand side of the body of the person being symmetric,
half head height<eye position,
body height<(leg length+torso length+2×eye position),
body height>(leg length+torso length+eye position)

The eye position is measured from the upper end of the torso.

The estimation made in step c) may comprise estimation of the position of a movement node of the person. The movement nodes correspond to joints of the body, such as an elbow, a wrist, a neck, a waist, a knee and/or an ankle joint, i.e. a location wherein the body may bend and/or rotate.

The method may further comprise the step of:
b2) determining a distance between the vehicle and the person by means of a distance measurement system, such as a radar system, a lidar system, an ultra-sound system or a stereo camera,
wherein step b2) is performed before step c), and step c) comprises using the determined distance as input for the estimation of the body parameter of the person.

Step b2) may be carried out before, during or after step a) and/or b). It may be carried out once in conjunction with capturing the first set of data, or repeatedly in conjunction with capturing a set of data.

The method further comprises the step of:
d) adjusting an adjustable component of the vehicle according to the determined body parameter.

The adjustable component of the vehicle may comprise one or more of: seat cushion position, seat cushion length, neck rest position, seat belt position, back rest angle including optional side supports, back rest angle upper part, power lumbar support, pedal position, steering wheel position, interior mirror position, exterior mirrors' position, gear shifter position, position of head-up display projection on windscreen, position of other displays, position of controls for media, climate, navigation etc., position of control located on steering wheel, position of arm support, position of cup holder, direction of AC output, sunblind, settings of a deployable airbag and opening angle of tailgate.

Many of these adjustable components are also available for a passenger. Therefore, the system may be used to determine body parameters of a passenger as well. The method may be set up such that it is assumed that the default is that the person being measured is the future driver. If the person instead is the future passenger, this may be indicated in an extra step of the method, e.g. when initiating the method.

The determined body parameters may be used to set the adjustable components to an initial setting, which is appropriate for that particular person. The settings may be selected to provide a safe seating in the vehicle, e.g. by adjusting the seat cushion, the back rest and the neck rest. Further, the driver's area may be adjusted provide an ergonomic seating, thereby providing comfort also during long rides in the vehicle.

Further, the captured sets of data may be used to build a 3D model of the person. The 3D model may be used for example to estimate the weight of the person, which may be useful to know when adjusting adjustable components of the vehicle.

The initial setting for a particular person may further be changed by that person according to his/her individual preferences. However, the initial setting based on the body parameters of that particular person provides a good starting point for making those individual adjustments, and in most cases only minor adjustments will be done. This is in comparison to prior art, wherein individual settings will start from an arbitrary position of the adjustable components or a zero position, resulting in that, for some persons, major adjustments have to be done, e.g. if the person is very short or very tall.

Once the particular person has made his/her settings, they may be stored in the vehicle and used the next time the same person uses the vehicle. As a complement, or an alternative, to storing the settings of the adjustable components, the body parameters of that particular person may be stored.

The method may be performed before the person enters the vehicle. In particular, the method may be carried out before the person enters the vehicle for the first time, e.g. when the person has bought or rented that vehicle.

The data capturing device may comprise a camera of the vehicle. The camera may be present in the vehicle, since it is used for another purpose, such as being a part of an anti-collision system of the vehicle. Thereby, no additional equipment is needed. The camera may be an optical camera or an IR camera.

The method may be initiatable from the outside of the vehicle by activation of a control, such as a key fob or smart phone, and/or from the inside of the vehicle. It may be initiated by the person, who is going to be measured, or by another person.

Purely as an example, if the person is going to enter the vehicle for the first time, e.g. because he/she has just bought or rented the vehicle, the sales person may initiate the method and also give an appropriate movement scheme to the person to be measured.

The method may be performed many times for the same person, e.g. if the person is dissatisfied with his/her current settings and want to reset to the settings of the adjustable components optimized according to his/her body parameters as a new starting point for making individual settings.

The method may further comprise the step of:
e) the vehicle signalling visibly and/or audibly, that steps a)-c), and optionally step b2) and/or d), have been performed.

Thereby it is possible to know when the method is ready.

According to a second aspect of the present disclosure, a computer program is disclosed stored in a computer readable storage medium and executed in a computational unit for determining a body parameter of a person, the person being outside a vehicle, the computer program comprising:

an instruction set for capturing a first set of data of the person by means of a first data capturing device of the vehicle, the captured first set of data being representative of a first body posture of the person, an instruction set for capturing a second set of data of the person by means of a second data capturing device of the vehicle, the captured second set of data being representative of a second body posture of the person, the second body posture being different from the first body posture, an instruction set for using the first and second sets of data as input for estimation of the body parameter of the person.

Normally, the first and the second data capturing device is the same device, e.g. a camera in the vehicle, as is explained above, but they may also be different as is also explained above.

The computer program is thus adapted to carry out the method steps described above as steps a)-c). In addition, the computer program may be adapted to carry out any other method step mentioned above. In particular the computer program may perform iteration as the ones mentioned above. The iteration may continue until a stable estimate of the body parameter is achieved. As an alternative, the iteration may be performed a predefined number of times or during a predefined time interval.

According to a third aspect of the present disclosure, a system is disclosed for determining a body parameter of a person, the person being outside a vehicle, the system being adapted to be comprised in a vehicle and comprising:

a first data capturing device for capturing a first set of data of the person, the captured first set of data being representative of a first body posture of the person, a second data capturing device for capturing a second set of data of the person), the captured second set of data being representative of a second body posture of the person, the second body posture being different from the first body posture, the second data capturing device optionally being the same as the first data capturing device, a computational unit adapted for using the first and second sets of data as input for estimation of the body parameter of the person.

Normally, the first and the second data capturing device is the same device, e.g. a camera in the vehicle, as is explained above, but they may also be different as is also explained above.

The system may optionally comprise a distance measurement system of the vehicle, e.g. a radar system, a lidar system, an ultra-sound system or a stereo camera.

According to a fourth aspect of the present disclosure, a vehicle is disclosed comprising such a system.

According to a fifth aspect of the present disclosure, a use of a data capturing device of a vehicle is disclosed, e.g. a camera, a computational unit and optionally a distance measurement system of the vehicle, e.g. a radar system, a lidar system, an ultra-sound system or a stereo camera, for determining a body parameter of a person according to the method as described above.

The method may use equipment already present in the vehicle for another purpose, such as equipment being a part of an anti-collision system of the vehicle.

BRIEF DESCRIPTION OF THE DRAWINGS

The present disclosure will hereinafter be further explained by means of non-limiting embodiments with reference to the appended drawings wherein.

It should be noted that the appended drawings are not necessarily drawn to scale and that the dimensions of some features of the present disclosure may have been exaggerated for the sake of clarity.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
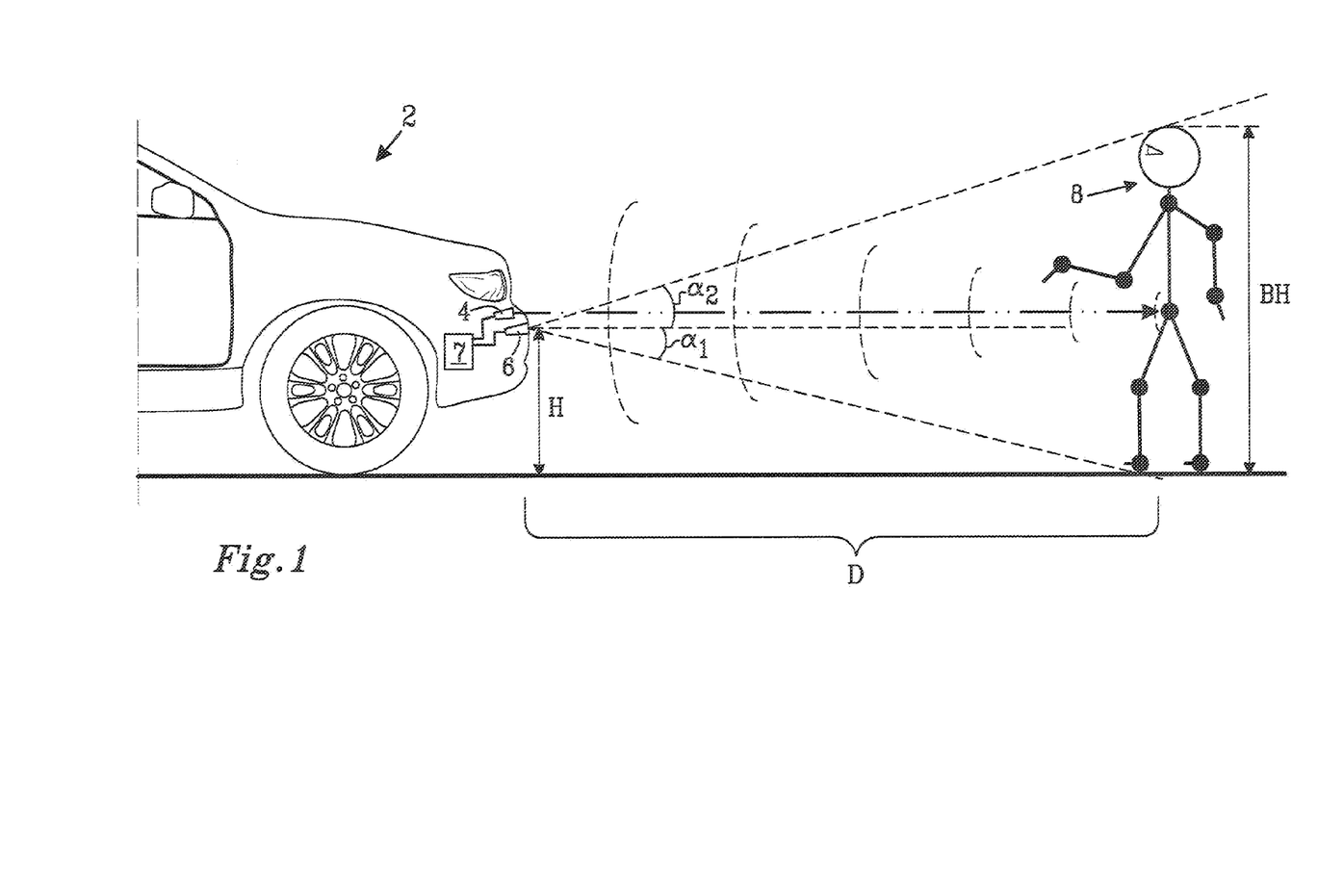
FIG. 1 is a schematic view of a vehicle being equipped to perform a method according to the disclosure.

FIG. 1 schematically illustrates a vehicle 2 being equipped to perform the method according to the disclosure. The vehicle 2 comprises a distance measuring system, here a radar system 4, and a data capturing device, here an optical camera 6. Further, the vehicle comprises a computational unit 7, to which the distance measuring system and the data capturing device are coupled. In the illustrated embodiment, the radar system 4 and the optical camera 6 are parts of an anti-collision system of the vehicle 2 being used to avoid a collision and/or to mitigate the consequences of a collision. It is thus possible to use equipment already existent in the vehicle for other purposes.

According to the method of the disclosure, the object to be measured is a person 8, which is a future vehicle occupant, i.e. a driver or a passenger, of the vehicle 2. When the method is carried out, the person 8 is outside of the vehicle 2, but in the vicinity of the vehicle. The suitable distance between the vehicle 2 and the person 8 depends on the ranges of the data capturing device 6 and the distance measuring system 4. If an optical camera 6 is used, as in FIG. 1, a suitable distance is 5-50 meters, preferably 10-40 meters, most preferably 15-30 meters. The method can be performed when the person 8 approaches the vehicle 2 with the intention to enter the vehicle 2. In particular, the method may be carried out the first time the person 8 approaches the vehicle. Once the method is carried out, the data for that person 8 may be stored in the vehicle 2, e.g. in a computer of an infotainment system.

The radar system 4 is used to determine a distance D to the person 8 by sending out a radar pulse with a known velocity $V_{radar}$ and measuring the time t the echo of the pulse takes to come back: $D=V_{radar}t/2$.

The data capturing device, e.g. the optical camera 6, is used to capture a first set of data being representative of a first body posture of the person 8. In the illustrated embodiment the optical camera 6 is used to capture a first image representative of the first body posture.

Next the person 8 moves, e.g. by walking or changing position of a body part, such that the person 8 thereafter takes a second body posture, being different from the first body posture. The whole body, or only a part of the body, of the person 8 may move. Further, the position relative to the ground may be the same or changed. Then a second set of data being representative of the second body posture of the person 8 is captured, in this case a second image is captured by the optical camera 6. If the whole body of the person 8 is moved, i.e. the position relative to the ground is changed, it is appropriate to measure a new distance D for the second body posture.

Figure 2:
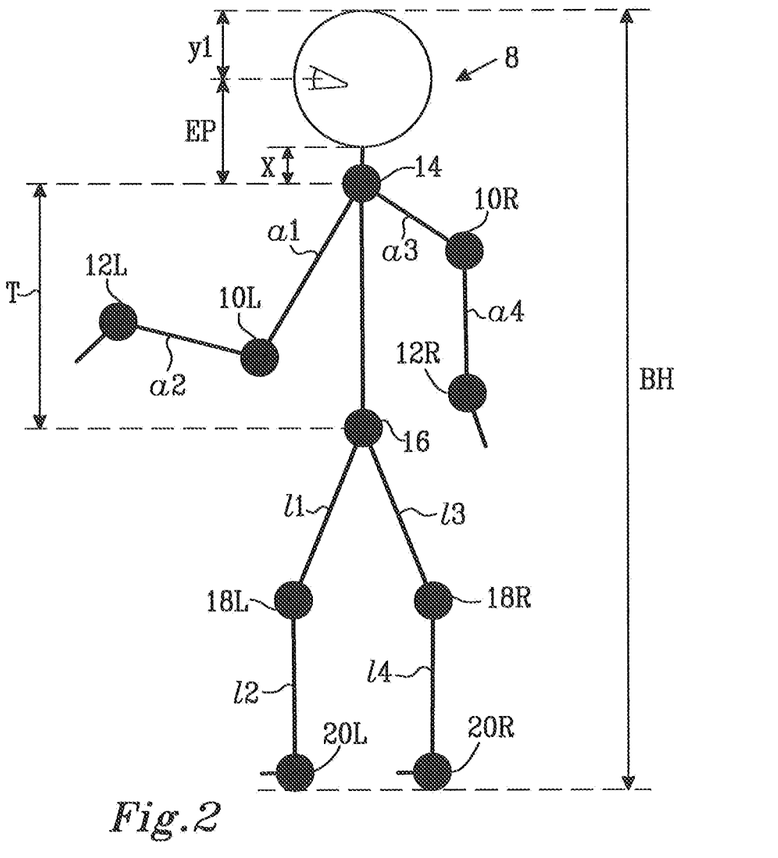
FIG. 2 illustrates how different body parameters are determined.

With a known distance D to the person 8 and a known height H of the camera 6, the camera 6 can be used to measure a body height BH of the person 8 and length of the different limbs of the person 8, i.e. arms, legs etc., as will be more detailedly explained below in conjunction with FIGS. 2-4.

If the body height BH is of the same height as the height H of the camera 6, BH=H, then α2 can be calculated: α2=arctan (H/D).

If the body height BH is smaller or larger the height H of the camera 6, the body height BH can be estimated by comparing the total angle, α=α1+α2, with the angle α2.

By using different sets of data representative for different body postures, it is possible to determine a selected body parameter also for a person wearing clothes obscuring the body, e.g. a skirt, a dress, a winter jacket or a hat.

Figure 5:
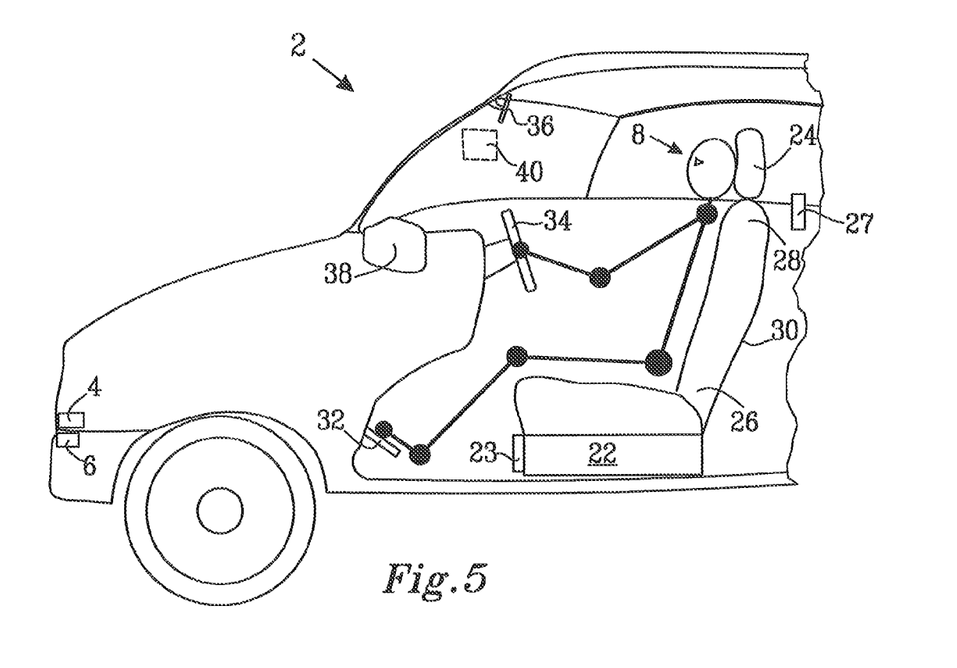
FIG. 5 illustrates various adjustable components in the driver's area.
Figure 6:
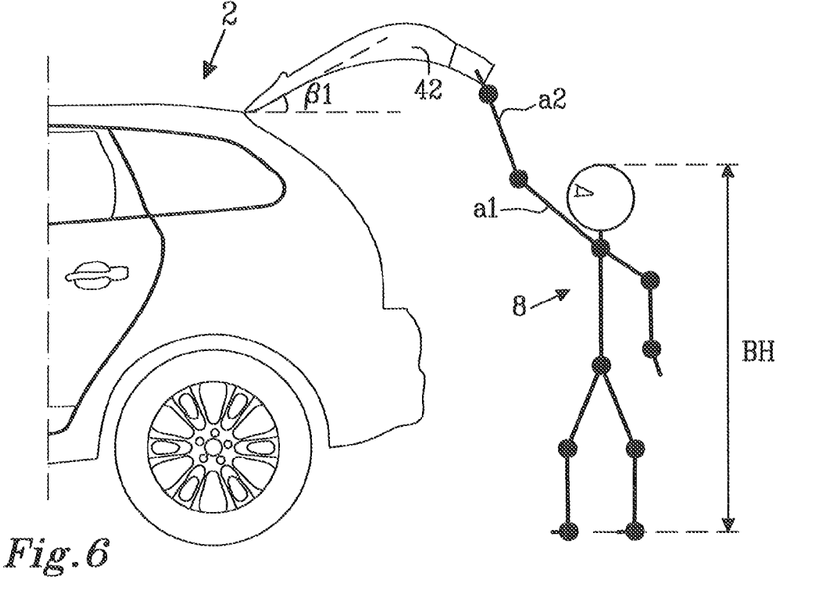
FIG. 6 illustrates a tailgate with an adjustable opening angle being in a first angle.
Figure 7:
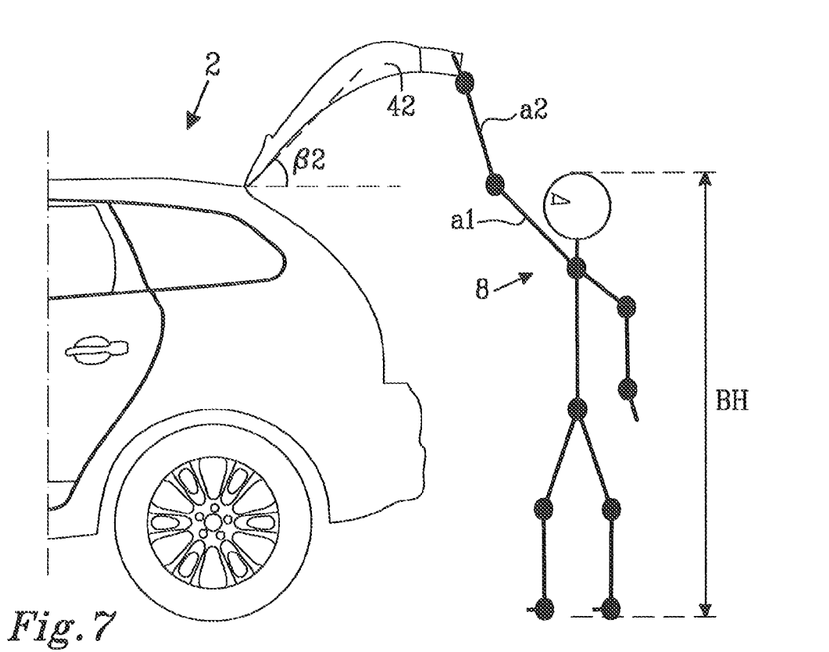
FIG. 7 illustrates the tailgate of FIG. 6 being in a second angle.

The determined body parameter may be used to adjust a setting of an adjustable component of the vehicle 2. Examples of adjustable components are illustrated in FIGS. 5-7.

The estimation of the body parameter comprises the estimation of the positions of movement nodes of the person 8. The estimation is carried out by the computational unit 7. The movement nodes are marked by filled dots in FIG. 1. The movement nodes correspond to joints of the body, such as an elbow 10L, 10R, a wrist 12 L, 12R, a neck 14, a waist 16, a knee 18L,18 R and an ankle joint 20L, 20 R, with L denoting left and R right. See FIG. 2.

Examples of body parameters for adjusting adjustable components of the vehicle 2 are:
arm length A=upper arm a1+lower arm a2
leg length L=upper leg l1+lower leg l2
body height BH
eye position EP
torso length T In the method according to an embodiment, the left-hand side and right-hand side of the body of said person 8 are assumed to be symmetric. Therefore, the left arm is assumed to be as long as the right arm: a1=a3 and a2=a4, and the left leg is assumed to be as long as the right leg: l1=l3 and l2=l4, with each of the measured parameters a1, a2, a3, a4, l1, l2, l3, l4 being located between two of the node points. As an example, the left lower arm a2 is located between the left elbow 10L and the left wrist 12L. The torso length T is located between the neck 14 and the waist 16.

In FIGS. 1-4, the connection between the head and the rest of the body is represented by one node point, the neck, 14, however, alternatively, three different node points representing the left shoulder, the right shoulder and the actual neck may be used.

Figure 3:
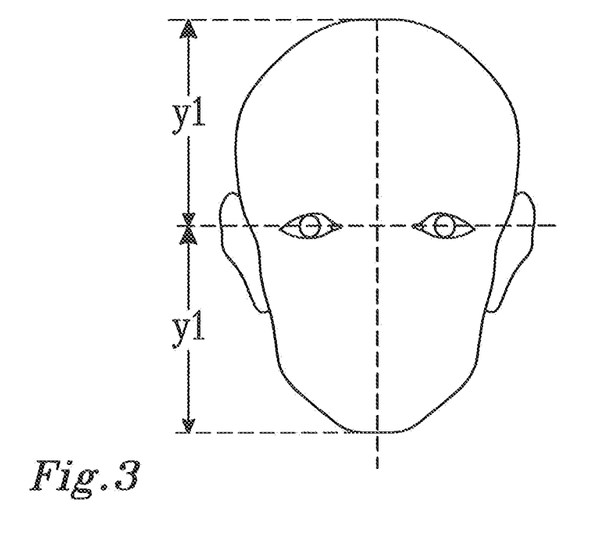
FIG. 3 illustrates the body parameter half head height.
Figure 4:
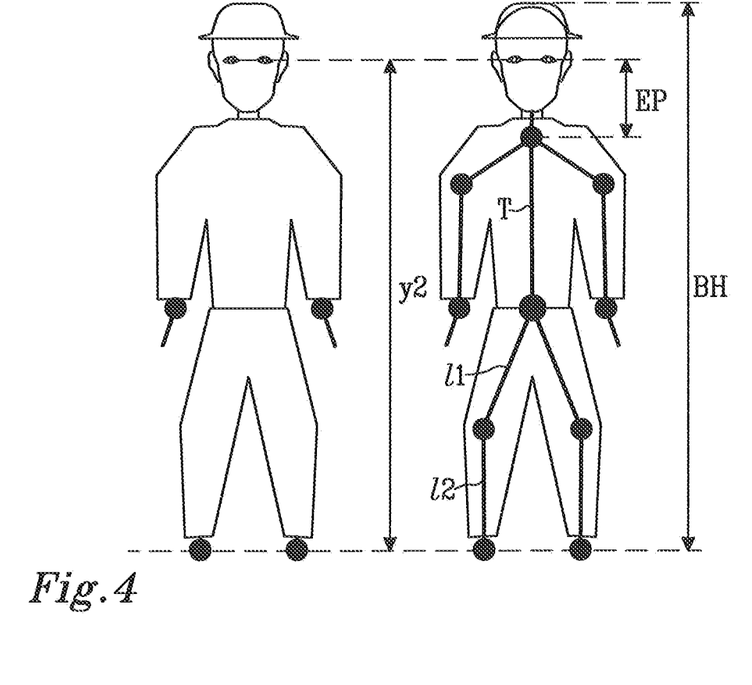
FIG. 4 illustrates the body parameter body height.

FIG. 3 shows some body parameters related to the head of the person. The eyes are approximately located at y1, being half of the height of the head. The eye position EP is measured from the upper end of the torso T, EP=y1+x, where x roughly corresponds to the length of the neck, hence x>0.

The body height BH refers to the total determined height of the person. However, if the person 8 to be measured wears a hat, the hat will also be included. See FIG. 4.

When estimating the different lengths one can assume some basic rules:
1) left-hand side and right-hand side of the body being symmetric
2) y1<EP
3) BH<(l2+l1+T+2×EP)
4) BH>(l2+l1+T+EP)

By allowing the person to move between at least two different body postures, where the term body posture also may encompass positions relative to the ground, the estimation process for the body parameters can be made with appropriate resolution even when the person wears bulky clothes and/or headgear. By allowing the person to walk or move, a refined estimate can be done by identifying positions of the movement nodes. In prior art methods only using one image, the body parameters in such a case would be hard to estimate, since the body in these cases would be obscured by the clothes.

The iteration process can be continued by capturing a third image and making a new refined estimation, capturing a fourth image and making a new refined estimation etc. until stable estimates for each body parameter have been defined. Purely as an example, an estimate of a certain body parameter p may be considered as stable, when the difference of the estimate number i and the estimate number (i−1) is less than a predefined value for that body parameter p, q(p), with i being a positive integer. Further, an additional condition may be that the basic rules above are fulfilled. Preferably the body posture differs between each time of the iteration.

As an alternative, the iteration may be performed by capturing data sets a predefined number of times or during a predefined time interval. Preferably the body posture differs between each time of the iteration. Thereafter the estimation of the body parameter of the person is performed by using the captured data sets as input. The predefined number of times or predefined time interval may be selected based on data about how many iterations are normally needed in order to get stable estimates of the body parameters.

The accuracy of the estimation can be improved by using more refined statistical data of the human body dimensions.

FIG. 5 illustrates a driver's area of the vehicle 2. The person 8 sitting in the driver's seat is surrounded by a number of adjustable components, which have been adjusted according to the body parameters of that person 8, for example:

seat cushion 22: tilt, height and length position, seat cushion length, including optional side supports and seat extension 23 neck rest 24: position and tilt, back rest 26: angle, including optional side supports,
seat belt 27: position
back rest upper part 28: angle,
power lumbar support 30,
pedals 32: position,
steering wheel 34: position,
interior mirror 36: position,
exterior mirrors 38: position,
gear shifter position,
head-up display projection on windscreen 40: position,
other displays: position,
position of controls for media, climate, navigation etc.,
position of controls located on the steering wheel,
arm support: position,
cup holder: position,
AC output: direction of airstream,
position of sun blind,
settings of a deployable airbag: deployment volume, deployment direction, which airbag/s to deploy.

Many of these adjustable components are also available for a passenger. Therefore, the system may also be used to determine body parameters of a passenger.

The determined body parameters may be used to set the adjustable components to an initial setting, which is appropriate for that particular person. The settings may be selected to provide a safe seating in the vehicle, e.g. by adjusting the seat cushion 22, back rest 26 and the neck rest 24. Further, the driver's area may be adjusted provide an ergonomically sound seating, thereby providing comfort also during long rides in the vehicle.

The initial setting for a particular person may further be changed by that person according to his/her individual preferences. However, the initial setting based on the body parameters of that particular person provides a good starting point for making those individual adjustments, and in most cases only minor adjustments will be done. This is in comparison to prior art, wherein individual settings will start from an arbitrary position of the adjustable components or a zero position, resulting in that for some persons major adjustments have to be done, e.g. if the person is very short or very tall.

Once the particular person has made his/her settings, they may be stored in the vehicle and used the next time the same person uses the vehicle. As a complement, or an alternative, to storing the settings of the adjustable components, the body parameters of that particular person may be stored.

There may also be adjustable components outside of the driver area, as exemplified by FIGS. 6 and 7. Since the body height BH and the arm length A=a1+a2 are known, the opening angle β1, β2 of the tailgate 42 may be adjusted to the reach zone of the person 8.

Figure 8:
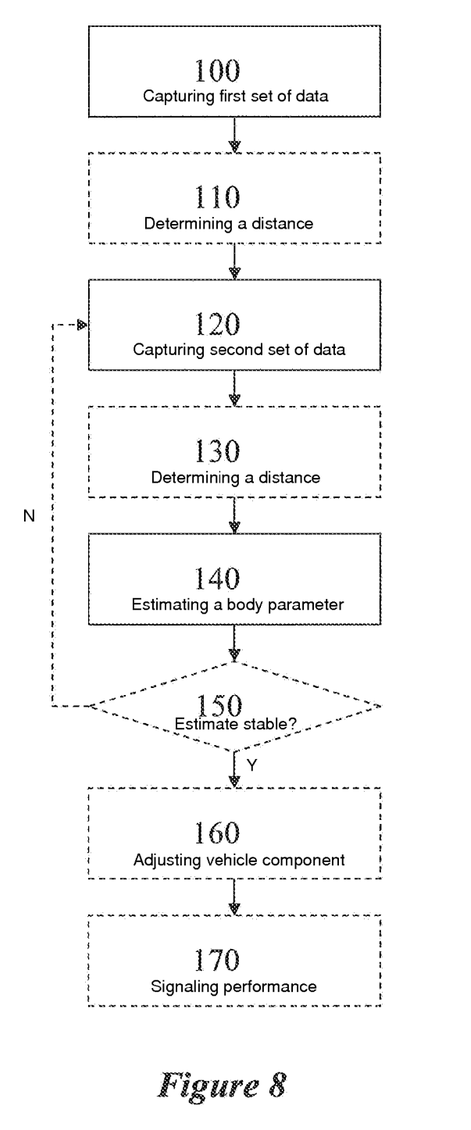
FIG. 8 is flowchart of the method according to an embodiment of the disclosure.

FIG. 8 illustrates the different steps of the method according to the disclosure. Boxes with dashed lines are used for optional steps.

100: Capturing a first set of data of the person 8 by means of a first data capturing device of the vehicle 2, in FIG. 1 the camera 6, the captured first set of data being representative of a first body posture of the person 8.

110: Optional step: Determining a distance D between the vehicle 2 and the person 8 by means of a distance measurement system, such as the radar system 4 of FIG. 1, a lidar system, an ultra-sound system or a stereo camera. Alternatively, step 110 may be carried out before or during step 100.

120: Capturing a second set of data of the person 8 by means of a second data capturing device of the vehicle 2. The second data capturing device is normally the same as the first data capturing device, illustrated in FIG. 1 as the camera 6. The captured second set of data is representative of a second body posture of the person, the second body posture being different from the first body posture.

130: Optional step: Determining a distance D between the vehicle 2 and the person 8 by means of a distance measurement system, such as the radar system 4 of FIG. 1, a lidar system, an ultra-sound system or a stereo camera. Alternatively, step 130 may be carried out before or during step 120. If the person 8 only changes body posture between step 100 and 120, and does not change position relative to the vehicle 2, the distance D will be the same, and therefore the distance D determined in step 110 may be re-used.

As an alternative to making a new determination of the distance D to the person 8, when capturing the different sets of data, the distance D may be determined by comparing the size of a certain body parameter between the different sets of data. Purely as an example, if a camera 6 is used and the body height BH has been determined, the actual depicted height in a certain image of the body height BH may be used as an indication of the distance D to the person 8, when that certain image was captured.

140: Using the first and second sets of data as input for estimation of the body parameter of the person 8.

A minimalistic version of the method only comprises steps 100, 120 and 140 without any iteration. However, if performing a plurality of iterations, see arrow pointing back to step 120, capturing an i-th set of data of the person 8, the accuracy of the estimation in step 140 will improve. The captured i-th set of data is representative of an i-th body posture of the person. The distance D may be measured only once, e.g. in step 110, in some of the iterations, or during each iteration. The iteration variable i is a positive integer, increasing by +1 for each iteration.

The method may comprise a conditional step:

150: Has a stable estimate of the body parameter been achieved?

The stability of the estimate may be evaluated for each body parameter individually or the whole set of body parameters. Purely as an example, the stability of the estimate may be evaluated by comparing the estimate of iteration i with the estimate of iteration (i−1) for a certain body parameter p. If the difference is less than a predefined value for that body parameter p q(p), the estimate is considered stable. In addition, it may be evaluated if the assumed basic rules mentioned above are fulfilled:

1) left-hand side and right-hand side of the body being symmetric
2) y1<EP
3) BH<(l2+l1+T+2×EP)
4) BH>(l2+l1+T+EP)

Dependent on the outcome of step 150, the method may either return to step 120 for an additional iteration or continue.

It may take 10-60 seconds to reach a stable estimate of a body parameter, typically 15-30 seconds. New sets of data may typically be captured 10-20 times per second. Some body parameters may be quicker to estimate than others. The method may be terminated before all desired body parameters have been determined. The non-detected body parameters may in that case be estimated from the body height BH and/or from other body parameters, which have successfully been determined. The method may also use statistical data of the human body dimensions as an input to the estimation of the body parameter.

The determined values of the body parameters may be used in a next step:

160: Adjusting an adjustable component of the vehicle according to the determined body parameter.

One, two, three or more of the above-mentioned adjustable components, see FIG. 5-7, may be adjusted.

The method may further comprise the optional step of:

170: The vehicle signalling visibly and/or audibly, that steps 100, 120, 140, and optionally step 110, 130 and/or 160, have been performed.

Step 170 may be performed before step 160, indicating that a stable estimate has been reached.

Thereby it is possible to know when the method is ready, e.g. when it is time for the person to enter the vehicle 2.

Figure 9:
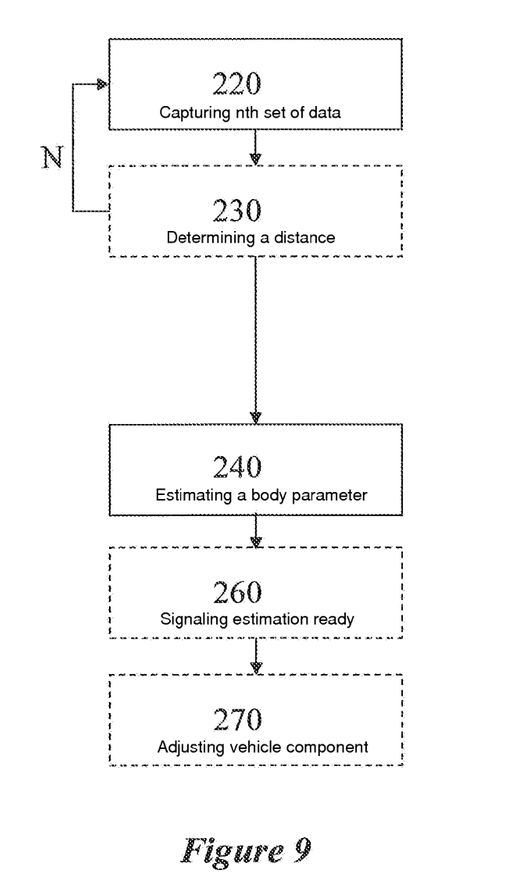
FIG. 9 is flowchart of the method according to another embodiment of the disclosure.

As an alternative, the iteration may be performed a predefined number of times or during a predefined time interval as illustrated in FIG. 9. Boxes with dashed lines are used for optional steps.

220: Capturing a n-th set of data of the person 8 by means of the data capturing device 6 of the vehicle 2. The captured n-th set of data is representative of a n-th body posture of the person.

230: Optional step: Determining a distance D between the vehicle 2 and the person 8 by means of a distance measurement system, such as the radar system 4 of FIG. 1, a lidar system, an ultra-sound system or a stereo camera. Alternatively, step 230 may be carried out before or during step 220. If the person 8 only changes body posture and does not change position relative to the vehicle 2, the distance D will be the same, and therefore the distance D may be re-used.

Steps 220 and the optional step 230 are repeated a performed a predefined number N of times or during a predefined time interval. The predefined number of times or predefined time interval may be selected based on data about how many iterations are normally needed in order to get stable estimates of the body parameters. Purely as an example, the iteration may be performed during a time interval of 10 to 60 seconds, preferably of 15-30 seconds.

240: Using the captured sets of data as input for estimation of the body parameter of the person 8.

The method may further comprise the optional step of:

260: The vehicle signalling visibly and/or audibly, that the estimation is ready.

Step 260 may be performed before step 240 signalling that the predefined number N of times has been performed or that the predefined time interval has lapsed.

The determined values of the body parameters may be used in a next step:

270: Adjusting an adjustable component of the vehicle according to the determined body parameter. One, two, three or more of the above-mentioned adjustable components, see FIG. 5-7, may be adjusted.

The method according to the disclosure is expected to be able to determine the body parameters of most persons, i.e. at least 50%, preferably at least 70% and most preferably at least 90% of the persons. If not succeeding, this may for example be due to that the clothes that person is wearing obscure the body or that the person carries something, e.g. a bag or an umbrella. If the method is not able to determine all the desired body parameters, e.g. the ones to be used for setting the adjustable components, the non-determined body parameters may be estimated from the body height BH and/or from other body parameters, which have successfully been determined. The method may also use statistical data of the human body dimensions as an input to the estimation.

The method may be set up such that it is assumed that the default is that the person being measured is the future driver. If the person instead is the future passenger, this may be indicated in an extra step of the method, e.g. by the person initiating the method, who may be the person, who is going to be measured, or another person.

The method may also comprise a step of indicating suitable positions for the person to be at when capturing the set of data, e.g. by means of a laser pointer. There may be a position associated with the capture of each set of data, i.e. a first position for the first set, a second position for the second set of data, . . . , an i-th position for the i-th set of data, . . . .

The method may also comprise a step of comparing the captured set of data with data such as statistical data of the human body dimensions saved in a local storage medium, e.g. located in the vehicle, or in a non-local storage medium, e.g. accessible by wireless communication.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for determining an eye position of a person located outside a vehicle, the method comprising:
    a) capturing a first set of data of said person when outside the vehicle by a first camera of said vehicle, said captured first set of data being representative of a first body posture of said person when outside the vehicle;
    b) capturing a second set of data of said person when outside the vehicle by a second camera of said vehicle, said captured second set of data being representative of a second body posture of said person when outside the vehicle, said second body posture being different from said first body posture;
    c) using said first and second sets of data as input for estimation of body parameters of said person when outside the vehicle, said body parameters comprising a leg length, a body height, a half head height and a torso length, said estimation comprising estimation of a position of a movement node of said person, the movement node comprising a joint of said person;
    c2) using said first and second sets of data as input for estimation of said eye position of said person, wherein said estimation of said eye position comprises assumption of at least one of the following rules:
       half head height<eye position,
       body height<(leg length+torso length+(2*eye position)),
       body height>(leg length+torso length+eye position); and
    d) adjusting automatically an adjustable component of the vehicle according to the estimated body parameter of the person, the adjustable component to be used by the person after entering the vehicle.

2. The method according to claim 1, wherein said body parameters further comprise an arm length.

3. The method according to claim 1, wherein said method is performed as an iteration process by repeating (b) and optionally (c) and (c2).

4. The method according to claim 1 further comprising:
b2) determining a distance (D) between said vehicle and said person by a distance measurement system, such as a radar system, a lidar system, an ultra-sound system or a stereo camera;
wherein (b2) is performed before (c), and (c) comprises using said determined distance (D) as input for said estimation of said body parameter of said person.

5. The method according to claim 1, wherein said adjustable component of said vehicle comprises one or more of seat cushion position, seat cushion length, neck rest position, seat belt position, back rest angle including optional side supports, back rest angle upper part, power lumbar support, pedal position, steering wheel position, interior mirror position, exterior mirror position, gear shifter position, position of head-up display projection on windscreen, position of other displays, positions of controls for media, climate, navigation, position of control located on steering wheel, position of arm support, position of cup holder, direction of AC output, sunblind, settings of a deployable airbag and opening angle of tailgate.

6. The method according to claim 1, wherein said method is performed before said person enters said vehicle.

7. The method according to claim 6, wherein said method is performed before said person enters said vehicle for the first time.

8. The method according to claim 1, wherein said method is initiatable from the outside of said vehicle by activation of a control, such as a key fob or smart phone, and/or from the inside of said vehicle.

9. The method according to claim 4 further comprising:
e) said vehicle signaling visibly and/or audibly that (a)-(c2), and optionally (b2) and/or (d), have been performed.

10. A non-transitory computer readable storage medium having computer executable instructions recorded thereon for determining an eye position of a person located outside a vehicle, said computer executable instructions comprising instructions for:
capturing a first set of data of said person by a first camera of said vehicle, said captured first set of data being representative of a first body posture of said person when outside the vehicle;
capturing a second set of data of said person by a second camera of said vehicle, said captured second set of data being representative of a second body posture of said person when outside the vehicle, said second body posture being different from said first body posture; and
using said first and second sets of data as input for estimation of body parameters of said person when outside the vehicle, said body parameters comprising a leg length, a body height, a half head height and a torso length, said estimation comprising estimation of a position of a movement node of said person, the movement node comprising a joint of said person;
using said first and second sets of data as input for estimation of said eye position of said person, wherein said estimation of said eye position comprises assumption of at least one of the following rules:
half head height<eye position,
body height<(leg length+torso length+(2*eye position)),
body height>(leg length+torso length+eye position); and
adjusting automatically an adjustable component of said vehicle according to the estimated body parameter of the person, the adjustable component to be used by the person after entering the vehicle.

11. A system for determining an eye position of a person located outside a vehicle, said system being adapted for use in a vehicle and comprising:
a first camera for capturing a first set of data of said person, said first set of data being representative of a first body posture of said person when outside the vehicle;
a second camera for capturing a second set of data of said person, said second set of data being representative of a second body posture of said person when outside the vehicle, said second body posture being different from said first body posture; and
a processor adapted for using said first and second sets of data as input for estimation of body parameters of said person when outside the vehicle, said body parameters comprising a leg length, a body height, a half head height and a torso length, said estimation comprising estimation of a position of a movement node of said person, the movement node comprising a joint of said person, the processor further adapted to use said first and second sets of data as input for estimation of said eye position of said person, wherein said estimation of said eye position comprises assumption of at least one of the following rules: half head height<eye position; body height<(leg length+torso length+(2*eye position)); body height>(leg length+torso length+eye position), the processor further adapted to generate a signal for adjusting automatically an adjustable component of the vehicle according to the estimated body parameter of the person, the adjustable component to be used by the person after entering the vehicle.

12. The system of claim 11 wherein said second camera and said first camera comprise a single camera.

13. The system of claim 11, wherein said body parameters further comprise an arm length.

14. The system of claim 11 further comprising a distance measuring system, such as a radar system, a lidar system, an ultra-sound system or a stereo camera, for determining a distance (D) between said vehicle and said person, the distance (D) for use as input for said estimation of said body parameter of said person.

15. The system of claim 11 wherein said estimation of said body parameter of said person is initiatable from the outside of said vehicle by activation of a control, such as a key fob or smart phone, and/or from the inside of said vehicle.

* * * * *